Jan. 1, 1952              B. H. BUSH              2,580,404
METHOD AND APPARATUS FOR CONTROLLING HUMIDITY
Filed March 14, 1946
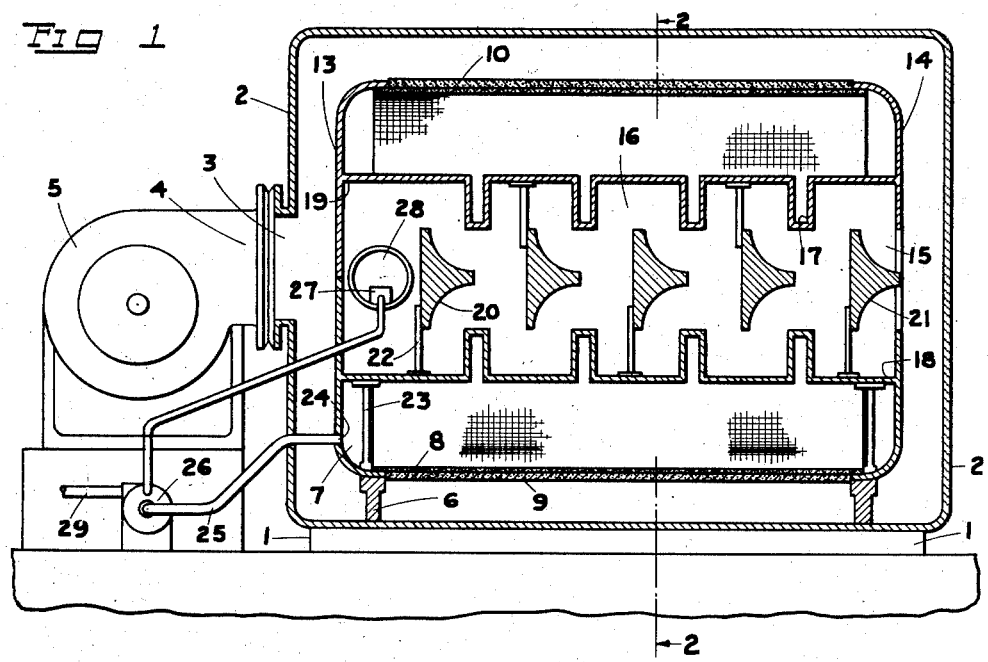
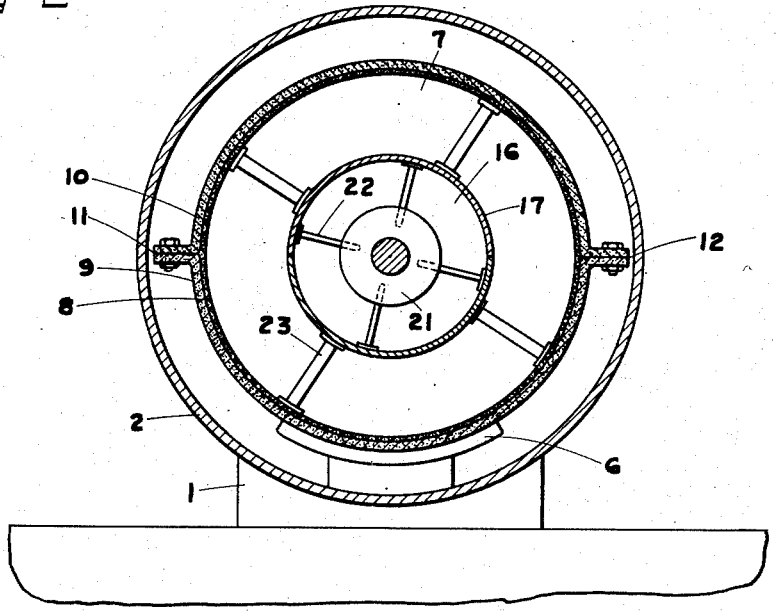
INVENTOR.
BURL H. BUSH
BY
*M. C. Hayes*
ATTORNEY Patented Jan. 1, 1952

2,580,404

UNITED STATES PATENT OFFICE 2,580,404

METHOD AND APPARATUS FOR CONTROLLING HUMIDITY

Burl H. Bush, United States Navy, San Francisco, Calif.

Application March 14, 1946, Serial No. 654,481

9 Claims. (Cl. 183—4.5)

(Granted under the act of March 3, 1883, as amended April 30, 1928; 370 O. G. 757)

This invention relates to a method and apparatus for controlling humidity and more particularly for dehumidifying air in compartments to protect equipment therein against corrosion, mold and rot and for regenerating and/or reactivating the dehumidifying agencies to render the operation substantially continuous.

Such a method and apparatus is of importance in the maintenance of ships and vessels that are subject to the effects of the water in which they ride, as well as the deteriorating effects of weather. To preserve equipment of such vessels, it is necessary to establish and maintain the humidity of the atmosphere in the vessel to within certain limits. For example, for vessels with steel hulls, a suitable maximum percent humidity is about 30%; a desirable minimum percent humidity is from about 25% to 28%. For vessels with wooden hulls a desirable percent humidity is about from 45% to 50%.

Ordinary atmospheric air contains sufficient moisture to cause bright metallic surfaces to corrode and other materials to mildew, rot and mold if continually exposed. Electrical equipment cannot be maintained in operable condition if impregnated with moisture. A dry atmosphere protects the vessel's equipment from deterioration of aluminum fittings due to corrosion by salt laden air and from formation of tarnish or verdigris on brass or bronze fittings.

Machines now in use for dynamically dehumidifying the interior of vessels are relatively complicated. They employ desiccants such as silica gel, activated alumina, and bauxite. Periodic reactivation of the desiccants is customary or dual beds of desiccant are employed, one of which may be used while the other is being reactivated. Extensive and relatively complicated desiccant reactivating machines are required in such units.

Objects of the present invention are, therefore, to provide for dehumidifying air in a simple, economical, and efficient manner; to provide for reactivating air dehumidifying desiccants in a novel manner by use of less than atmospheric pressures applied to such desiccants; to provide for using sensible heat developed by adsorption of moisture on dehumidifying desiccants to reactivate such desiccants; to provide for the continuous reactivation of dehumidifying desiccants; and to provide for the cooperation of heat and pressure in such a manner as to continuously reactivate such desiccants.

In accomplishing these and other objects of the present invention, I have provided improved details of structure in apparatus for carrying out novel steps in my method, the method and apparatus being described in the following specification and illustrated in the accompanying drawing, wherein:

Fig. 1 is a side elevational view of a humidity controlling apparatus embodying the present invention, the chamber forming shells thereof being shown in vertical cross section.

Fig. 2 is a transverse, vertical cross-sectional view through my improved humidity control unit on line 2—2 of Figure 1 showing the relation of the moisture adsorbing desiccant to pressure, vacuum, and heat transfer chambers of the unit.

Referring more in detail to the drawing:

1 designates a base or support upon which a metal or like cylinder 2 is mounted. The cylinder 2 is closed except for an inlet 3 provided with suitable securing flanges to which is connected the outlet 4 of a fan 5 of suitable design.

The humidity controlling unit, comprising the shell 2 and fan 5, is placed in a compartment, the humidity of the air of which is to be controlled, the fan 5 acting on the air in the compartment and forcing it into the cylinder 2.

Arranged within the cylinder 2 and extending longitudinally along the bottom wall thereof, is a cradle 6 that supports a cylinder 7 in interiorly spaced concentric relation to the cylinder 2. The cylinder 7 preferably comprises air tight end walls and is provided with a wire mesh support 8 located about a substantial portion of its length circumferentially of the cylinder wall.

9 and 10 designate slabs of a desiccant material, for example, silica gel, activated alumina or bauxite, or some other preferably adsorbent type, the desiccant preferably being rolled into semi-cylindrical form and having its edges joined, as at 11 and 12, to form a hollow cylinder. The end 13 of the cylinder 7 adjacent the fan 5 is closed, as indicated, while the opposite end 14 of the cylinder 7 has an opening 15 leading to a heat transfer chamber 16. The chamber formed by the cylinder 7 and the chamber 16 are separated by the walls 17 of the heat transfer chamber 16 that are so arranged as to provide substantial cooling surfaces to facilitate heat transfer between the chamber 16 and the interior of the chamber 7. The walls 17 of the chamber 16 close off the inlet 15 to the chamber 16 from the chamber 7, as indicated by the wall junctures 18 and 19 between the chambers 7 and 16.

In order to agitate air entering the chamber 16 and extract heat therefrom to advantage, longitudinally spaced baffles 20 and 21 are axially mounted in the chamber 16. The baffles are supported in the chamber 16 by the brackets 22 secured to the baffles and to the wall of the cylinder 16, respectively.

The bounding walls of the chamber 16 are preferably supported in concentric relation to the baffles 20 and 21 and the desiccant walls of the chamber 7 by spacing brackets 22 and 23.

An important feature of the present invention is the arrangement for impressing less than atmospheric pressure on the interior of the chamber 7. To this end a bleed hole 24, Fig. 1, is provided in the chamber 7, into which a vacuum line 25 is tapped. The vacuum line 25 leads to a vacuum pump 26 of suitable design. The vacuum pump 26 is preferably arranged for energization and deenergization in predetermined sequence by a humidostat 27 located in the humidity controlling unit and preferably arranged in an outlet 28 from the heat transfer chamber 16. The outlet 28 may be provided with suitable connections opening into the compartment being dehumidified. The outlet 29 from the vacuum pump 26 is preferably provided with hose or like connections leading to the atmosphere exteriorly of the compartment being dehumidified.

In using the apparatus described for carrying my method into effect, and assuming the described humidity controlling unit to be in a compartment to be dehumidified, the fan 5 is energized to draw moist air from the compartment and force it into the cylinder 2 into contact with the desiccant slabs 9 and 10 on the exterior surfaces of such slabs.

As is known, a desiccant is a drying agent which removes moisture from air in contact with it. The desiccant is a porous material having the ability to condense water vapor on its internal surfaces without itself being changed physically or chemically. The desiccant takes water vapor from the air. When the desiccant has adsorbed all the water vapor that it efficiently can under the existing conditions of the ambient air, its adsorbing properties become exhausted and it must be reactivated to effectively take more water vapor out of the air passing over it.

As the moist air from the fan passes over the desiccant slabs, and as the water vapor is adsorbed by the desiccant, an increase in the sensible heat of the air stream takes place, the gain in heat being proportional to the loss in latent heat of the water vapor in the air stream.

As the desiccant slabs 9 and 10 become saturated, it is necessary to reactivate the desiccant if the dehumidification of the air stream is to be continued. The air stream from the fan 5 passes to the inlet 15 of the heat transfer chamber in dry condition and in a condition of increased sensible heat.

I have found that by creating a partial pressure on the inside of the slabs 9 and 10 within the chamber 7 as by means of the vacuum pump 26, the moisture adsorbed on the desiccant is evaporated into the vacuum chamber 7. Such evaporation of moisture in the vacuum chamber requires latent heat of vaporization. The latent heat required is supplied from the sensible heat of the dehumidified air stream that passes into the heat transfer chamber 16 through the inlet 15 thereto.

The rate of evaporation of moisture from the desiccant and also the rate of adsorption of water vapor on the desiccant from the moist air stream is inversely proportional to the absolute pressure in the vacuum chamber 7.

The humidity of the treated air may thus be controlled by the humidostat 27, which may be set to energize and deenergize the vacuum pump in relation to the humidity obtaining at the outlet 28 from the unit.

In recapitulation, therefore, moist air entering the outside chamber 2 has water vapor extracted therefrom by adsorption of the water vapor on the desiccant cylinder 9—10. Such air stream is thus dried and its sensible heat is increased. The dried, heated air passes to the heat transfer chamber 16 and gives up its latent heat to the cooling surfaces 17, which heat is transferred to the vacuum chamber 7 to coact with the partial pressure in the chamber to effect evaporation of moisture in the vacuum chamber entering through the desiccant. This moisture plus a small amount of air leaking through the desiccant is discharged to the atmosphere by means of the vacuum pump outlet line 29 and the dry air from which the moisture has been removed goes back into the compartment being dehumidified through the outlet 28.

It is therefore apparent that I have provided a method and apparatus by which air may be dehumidified continuously in a novel, economical, and efficient manner without the requirement of auxiliary equipment or shut-downs of dehumidifying equipment.

While I have shown but one embodiment of my invention, it is susceptible to modification without departing from the spirit of the invention. I do not wish, therefore, to be limited by the disclosures set forth, but only by the scope of the appended claims.

The invention described herein may be manufactured and used by or for the Government of the United States of America for governmental purposes without the payment of any royalties thereon or therefor.

I claim:

1. In an apparatus of the character described, an elongated external shell having an inlet opening at one end thereof, means for supplying relatively moist air to said external shell inlet from a compartment to be dehumidified, a second shell having walls supported in interiorly-spaced relation to the first named shell forming a first chamber therebetween, at least a portion of said second shell being formed of a desiccant, a third shell having cooling surfaces in interiorly-spaced relation adjacent to the desiccant walls to form a second chamber between said second and third shells, said cooling surface shell having an inlet in spaced relation to the inlet to the external shell establishing communication between the interior of the cooling surface shell and the interior of the external shell and an outlet establishing communication between the interior of the cooling surface shell and a region exterior of the external shell, with the desiccant portion of said internal shell walls being disposed in the region between the planes of said inlets, whereby moist air supplied to the inlet of said external shell passes over said desiccant walls into the interior of the cooling surface shell and through the cooling surface shell and the outlet of said cooling surface shell, and means for impressing a less than atmospheric pressure in the chamber formed between the desiccant and cooling surface shells.

2. In an apparatus of the character described, structure providing a vacuum chamber, and providing inter-connected pressure and heat transfer chambers, the pressure chamber being disposed in spaced relation about the vacuum chamber and having an inlet at one end thereof, the heat transfer chamber being disposed in spaced relation within the vacuum chamber and having an outlet establishing communication between the interior of the heat transfer chamber and a region exterior of the pressure chamber, a desiccant wall separating the pressure and vacuum chambers and forming a section of the wall of the vacuum chamber adjacent the heat transfer wall of the heat transfer chamber, means for supplying moist air from a compartment to be dehumidified to the pressure chamber inlet, means for withdrawing partially dried air from the heat transfer chamber outlet and returning it to the compartment, and means for maintaining a reduced pressure in the vacuum chamber sufficient to evaporate moisture from the desiccant wall.

3. In an apparatus of the character described, means for passing moist air over a desiccant to effect adsorption of moisture from the air thereon, means for passing air thus partially dried and heated by latent heat of vaporization in indirect heat transfer relation with the surface of the desiccant opposite to the adsorption surface thereof to supply heat thereto, means operable during the adsorption process for applying reduced pressure on the side of the heated desiccant opposite relative to the moisture adsorbing side thereof to evaporate the moisture and to reactivate the desiccant, and means for simultaneously withdrawing the evaporated moisture from the reactivated desiccant separate from the partially dried air.

4. The method of controlling humidity consisting of supplying a moist air stream from a compartment to be dehumidified to a desiccant to effect adsorption of moisture on the desiccant and to liberate latent heat of vaporization, passing air thus partially dried and heated by latent heat of vaporization in indirect heat transfer relation with the surface of the desiccant opposite to the adsorption surface thereof to supply heat thereto, evaporating moisture adsorbed on said desiccant by subjecting it to reduced pressure, transferring the evaporated moisture separately to atmosphere and separately returning the partially dried air stream to the compartment.

5. The method of controlling humidity consisting of passing relatively moist air from a compartment to be dehumidified over one surface of a desiccant under pressure to effect sorption of moisture by the desiccant from the air and to liberate latent heat of vaporization, passing the then relatively drier air heated by latent heat of vaporization during the sorption step through a chamber in indirect heat transfer relation with another surface of said desiccant, subjecting the other surface of the desiccant to reduced pressure whereby the moisture taken up by said desiccant is evaporated by the reduced pressure and by heat received from the relatively drier air, and separately withdrawing the relatively drier air separate from the evaporated moisture.

6. A method of removing moisture from moist air comprising, continuously passing moist air over one wall of a desiccant body to effect adsorption of moisture thereon and to deliver sensible heat of adsorption to the partially dried air, continuously passing the partially dried air in indirect heat transfer relation and in contact with a heat transfer medium disposed adjacent a second wall of the desiccant opposite the first-mentioned wall to continuously deliver heat recovered from the partially dried air to the desiccant body, continuously maintaining a reduced pressure in the atmosphere adjacent the second-mentioned desiccant wall relative to that of the atmosphere adjacent the first-mentioned desiccant wall sufficient to desorb moisture from the desiccant, continuously removing the desorbed moisture from the desiccant, and continuously discharging the partially dried air from the zone of the heat transfer medium.

7. In an apparatus of the character described, an external shell having an opening therethrough communicating with a source of moist air, a second shell having a section of wall composed of a desiccant supported in interiorly spaced relation to and adjacent the wall of the first named shell, the external shell enclosing and being spaced from the second shell to define a passage for air from the opening through the external shell over the desiccant walls to a zone adjacent the side of the external shell opposite the side having an opening therethrough, a third shell having a portion of its wall disposed in interiorly spaced relation to and adjacent the desiccant wall of the second shell, that same portion of the wall of the third shell being adapted to recover heat from hot air and to transfer heat in the direction of the desiccant wall, means for maintaining a reduced pressure in the chamber defined by the second and third shells, the third shell having an inlet opening therethrough disposed adjacent said zone and establishing communication between the interior of the third shell and the interior of the external shell, and said third shell having an outlet conduit for establishing communication between the interior of the third shell and a region exterior of the external shell to define a passage for air from said zone over the interior walls of the third shell and to the region exterior of the external shell.

8. In an apparatus of the character described, an external cylindrical shell having an opening through one end thereof communicating with a source of moist air, a second cylindrical shell in interiorly-spaced concentric relation to the external shell and having a section of wall composed of a desiccant, the external shell enclosing the second shell to define a passage for air from said opening over the desiccant to a zone adjacent the end of the external shell opposite said first-mentioned end, a substantially cylindrical chamber in interiorly-spaced relation to the second shell having a portion of its wall adjacent the desiccant wall and adapted to recover heat from hot air and transfer heat to the desiccant wall, means for maintaining a reduced pressure in the space lying exterior of said cylindrical chamber and interior of said second cylindrical shell, an inlet opening through the end of the chamber disposed adjacent said zone and establishing communication between the interior of the chamber and the interior of the external shell, and an outlet conduit adjacent the end of the chamber opposite the end containing the inlet opening and establishing communication between the interior of the chamber and a region exterior of the external shell to define with the chamber a passage for partially dried hot air from said zone over the interior walls of the chamber to the region exterior of the external shell.

9. The method of controlling humidity consisting of applying moist air from a compartment to be dehumidified to a closed shell, passing said moist air over a desiccant in the shell to effect adsorption of moisture on the desiccant and increase of sensible heat of the air proportionally to the loss in latent heat of the water vapor in the air stream due to said adsorption, maintaining a reduced pressure on the surface of the desiccant opposite that exposed to said stream of moist air, passing the stream of dried air of increased heat through a chamber in indirect heat transfer relation with the region of reduced pressure to effect, cooperatively with the reduced pressure, evaporation of moisture from the desiccant, circulating the dry air back to the compartment, and evacuating the evaporated moisture to atmosphere remotely from the compartment being dehumidified.

BURL H. BUSH.

REFERENCES CITED

The following references are of record in the file of this patent:

UNITED STATES PATENTS

| Number | Name | Date |
|---|---|---|
| 1,533,053 | Wilson | Apr. 7, 1925 |
| 1,863,656 | Hartman | June 21, 1932 |
| 2,223,586 | Thomas | Dec. 3, 1940 |
| 2,273,350 | Fry | Feb. 17, 1942 |
| 2,336,456 | Anderegg | Dec. 14, 1943 |
| 2,399,246 | Patrick | Apr. 30, 1946 |

FOREIGN PATENTS

| Number | Country | Date |
|---|---|---|
| 409,652 | Great Britain | July 22, 1932 |